UNITED STATES PATENT OFFICE.

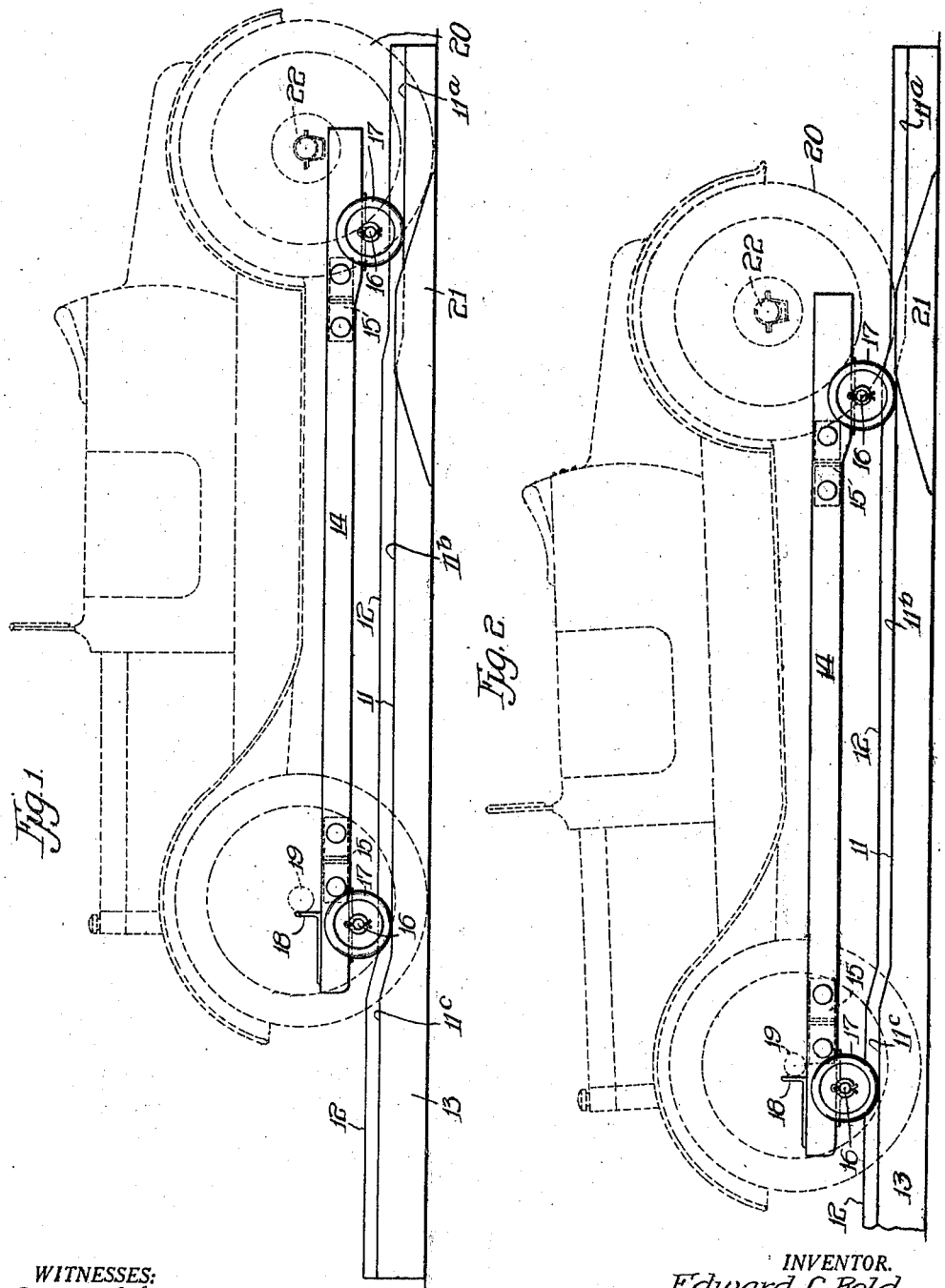

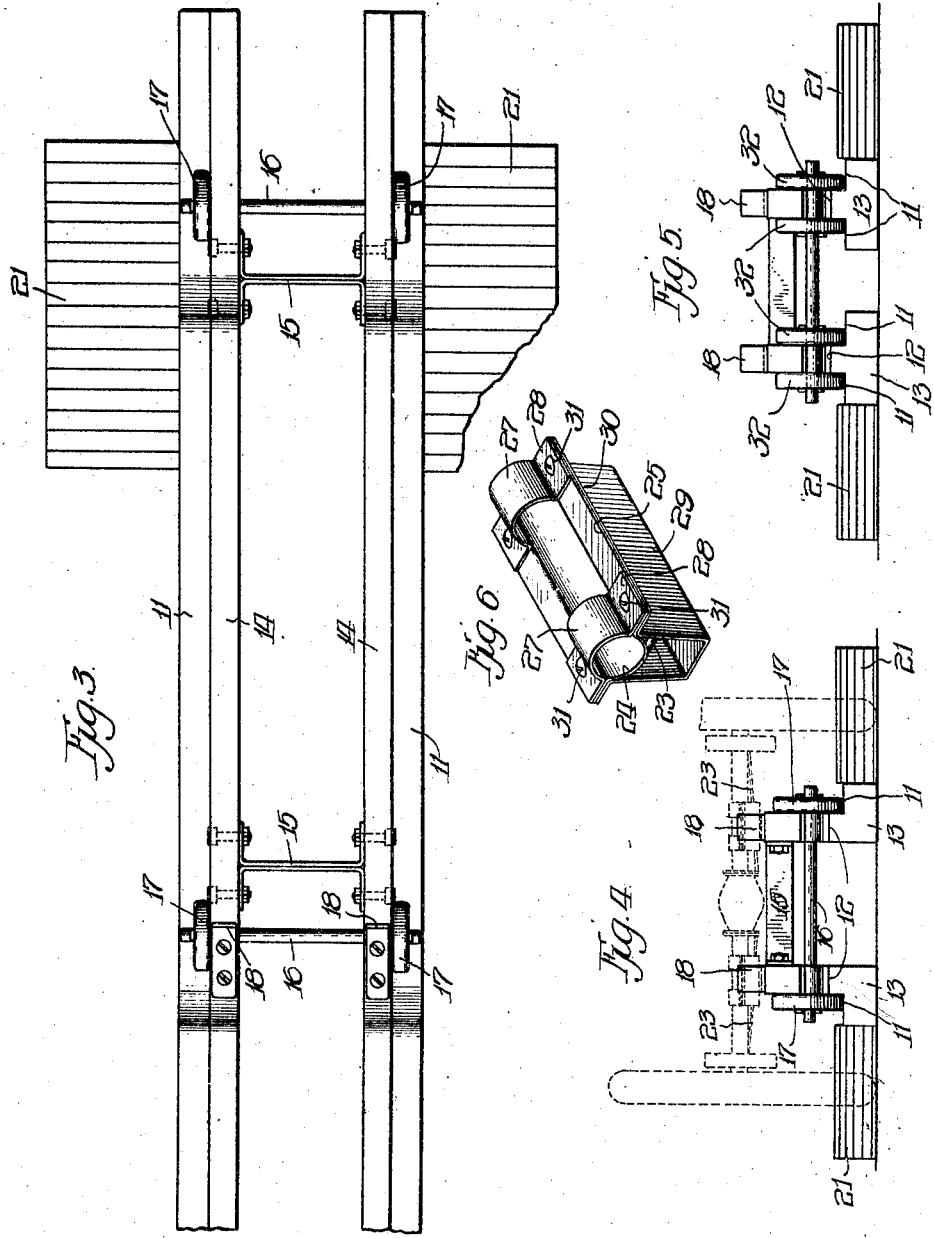

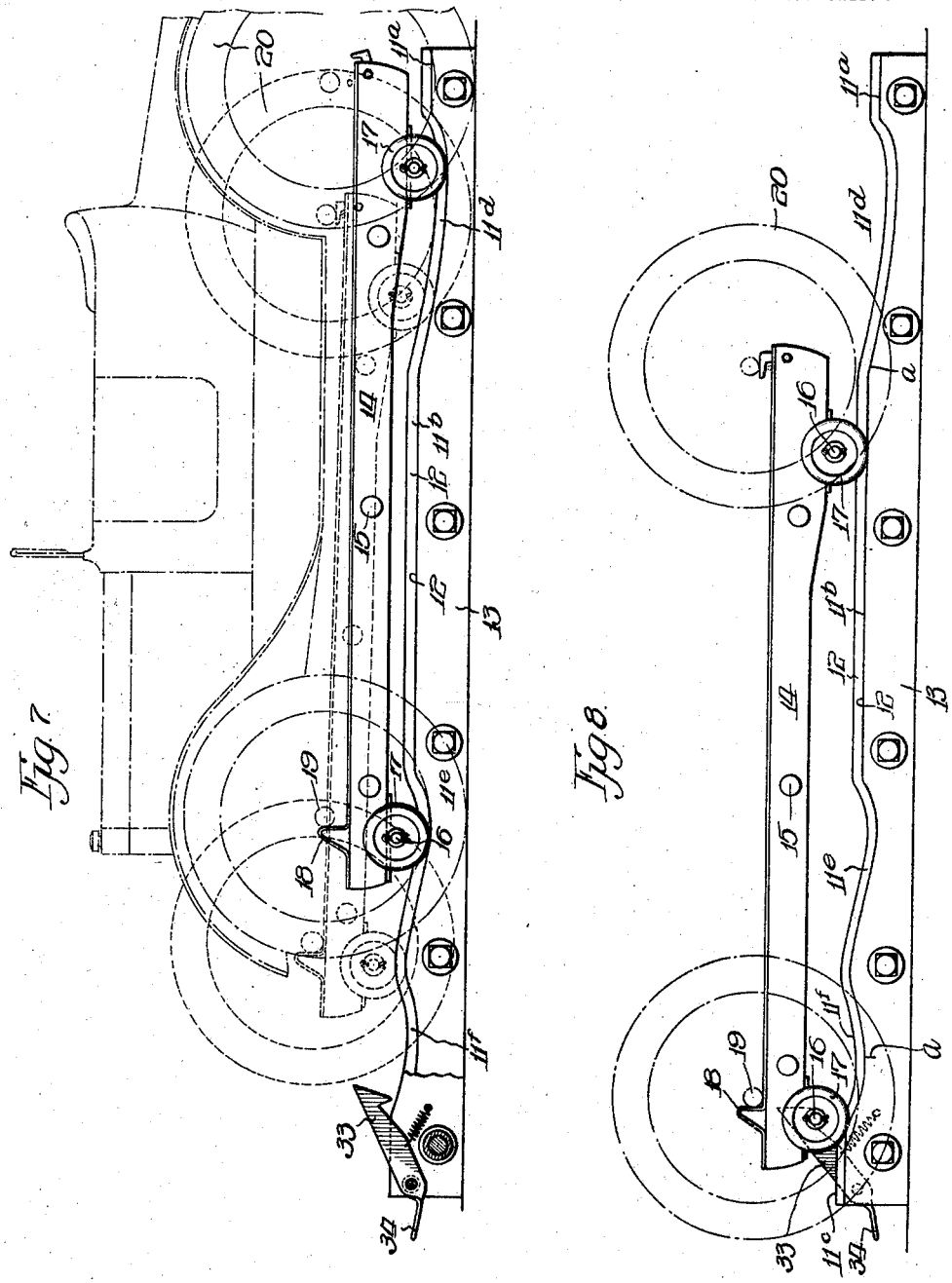

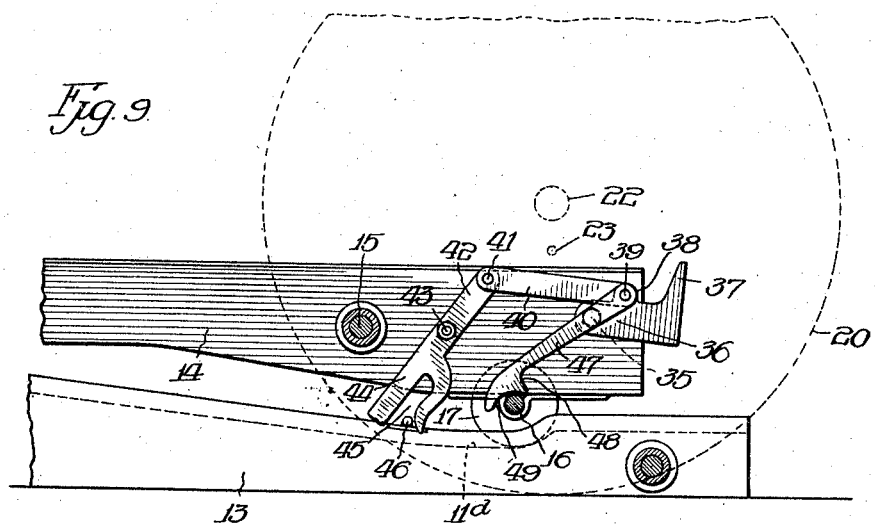
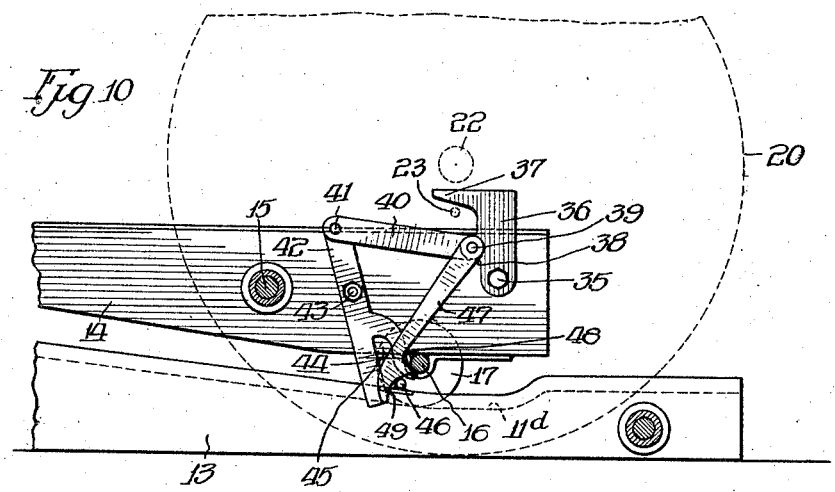
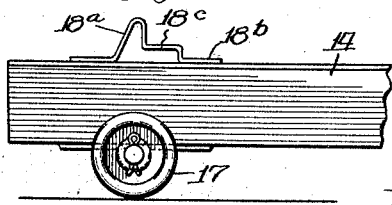

EDWARD CHARLES ROLD, OF OAKVILLE, IOWA.

SELF-LIFTING JACK.

1,315,335.  Specification of Letters Patent.  Patented Sept. 9, 1919.

Application filed February 19, 1919. Serial No. 277,971.

*To all whom it may concern:*

Be it known that I, EDWARD C. ROLD, a citizen of the United States, residing at Oakville, in the county of Louisa and State of Iowa, have invented certain new and useful Improvements in Self-Lifting Jacks, of which the following is a specification.

My invention has for its primary object the provision of means for installation in a garage whereby with the least inconvenience a car upon reaching its station in the garage is by its own power automatically elevated and brought to rest with its wheels clear of the floor, and with its weight supported by the car frame, in order that the pneumatic tires shall be freed from the load, and moreover, work on the car be facilitated, as for instance in cleaning, transfer of tires, rims, etc.

While the advantage of removing the load of the car from the tires has long been recognized, the jacking up of the car has entailed so much labor and inconvenience that it has not been the custom to take the necessary trouble where the car is in continual or even periodical use, but only to do so when laid by for the season.

According to the present invention no care or labor is involved. The device of the present invention having been installed at but a slight expense, the entering car is run on to the same and is thereby lifted clear of the floor, and upon leaving again descends from its elevated position to the floor. The life of the tires is increased, the car, in the meantime, is more readily accessible for adjustment, cleaning and repair; and all this without that thought and trouble which ordinarily precludes the jacking up of the car.

In order that the invention as well as the manner of its use may be made perfectly clear, preferred and modified embodiments of the same are set forth in the accompanying drawings and in the following detailed description predicated thereon. As, obviously, the invention is susceptible of further modifications without departure from the essence thereof, it will be understood that the drawings and description are to be taken in an illustrative and not in an unnecessarily limiting sense.

In the drawings—

Figure 1 is a side elevation of the device associated with a car which is about to be elevated thereby;

Fig. 2 is a similar view just prior to the car coming to rest in its elevated position;

Fig. 3 is a top plan view of the invention;

Fig. 4 is a rear elevation of Fig. 1;

Fig. 5 is a rear end view of a modification;

Fig. 6 is a detail perspective of a rear axle guard for the car;

Fig. 7 is a side elevation of a modification illustrating the car at two different stages of elevation; and Fig. 8 is a similar view illustrating the car at the third or final stage of elevation.

Figs. 9 and 10 are detail views showing the rear axle support in different positions; and Fig. 11 is a detail of the rear axle abutment.

Having reference to Figs. 1 to 4 of the drawing, the self-lifting jack of the present application will be seen to comprise a pair of spaced parallel tracks or ways 11, with guard rails 12, advantageously formed of timbers 13. These ways may be of any convenient length in excess of that of the car to be elevated. The surface of the ways is at a progressive inclination forward and may be advantageously formed in steps as illustrated in Figs. 1 and 2, these three successive elevations being indicated at $11^a$, $11^b$ and $11^c$.

A carriage comprising frame members 14 spaced and braced by the members 15 have journaled therein suitable axles 16 carrying wheels 17 which travel on the ways 11. At the forward end of the carriage are fixed abutments 18.

These ways and the superposed carriage are disposed in the garage at the place to be occupied by the car when not in use. As the car enters the garage, it is guided astraddle of the carriage which latter occupies the position shown in Fig. 1 of the drawing. It will be observed that the front and rear axles of the car clear the upper surface or top of the carriage. As the car proceeds under its own power, the front axle 19 strikes the abutment 18 and pushes the carriage with it, the front wheels of the carriage climbing from the way surface $11^b$ to the surface $11^c$, thereby lifting the front end of the car by means of its axle 19, this condition being illustrated in Fig. 2. During this forward movement of the car and carriage, the drive wheels 20 climb the riser block 21, causing the rear end of the carriage frame 14 to engage beneath the rear axle 22 of the car and, as the rear wheels of the carriage climb from the way portion $11^a$ to the way portion 11$^b$ and the traction wheels 20 of the car descend the opposite slope of the riser block 21, the car is left suspended above the floor by means of its front and rear axles resting upon the upper surface of the carriage. The position of the car and carriage relative to each other just before the descent of the car wheels from the riser block is illustrated in Fig. 2.

When it is desired next to use the car, the operation is reversed until the car and carriage occupy the position shown in Fig. 1 after which the car may be backed out of the garage free of the carriage. If during the forward movement of the car the wheels 20 cleared the riser block to such an extent as to be out of contact therewith and thus afford no traction, the carriage with its load may be pushed backward slightly until the wheels 20 engage the block or, in some cases, it may be found desirable to have the riser blocks 21 movable so that they can be shoved forward into contact with the wheels under such circumstances. The riser blocks 21 may also be substituted, though less advantageously, by providing a depression in the garage floor corresponding to the forward downward slope of the riser blocks.

In the case of some makes of cars, the rear axle is provided with truss rods as indicated generally at 23 in Fig. 4, in which case a guard is required for interposition between the axle and carriage in order to protect such rods. In such cases, I provide for attachment to the rear axle a guard such as that shown in Fig. 6. The trough-like member 24 having side flanges 25 is made to underlie the axle and is secured thereto by means of hanger members 27 having flanges 28 to overlie the flanges 25. A housing for the truss rods 23 is provided as indicated at 29 the same having outturned flanges 30 underlying the flanges 25 and 28, the whole being assembled by means of bolts 31. When in place on the rear axle at both sides of the center line of the car, the housing 29 serves to transmit the weight of the car to the side frames 14 of the carriage. This is clearly shown in Fig. 4 of the drawing.

In Fig. 5 of the drawing is shown a slight modification wherein the timbers 13 are so formed as to provide two ways 11 on each side of the guard rail 12. This is in order to enable the employment of two carriage wheels 32 on each side of the center line of the car instead of one as in the previous figures.

Figs. 7 and 8 illustrate a further embodiment of the invention wherein the riser blocks are entirely done away with by changing the contour of the ways.

Referring to these figures, it will be seen that in addition to the three horizontal portions of the ways 11$^a$, 11$^b$ and 11$^c$ at successive elevations, intermediate portions 11$^d$, 11$^e$ and 11$^f$ are provided connecting the portions 11$^a$, 11$^b$ and 11$^c$, the concave portions 11$^d$ and 11$^e$ being abrupt at the right hand end and of gradual slope at the left hand end, while the portion 11$^f$ is more abrupt at the left hand end and gradual at the right hand, a peak being presented at the junction points of the concave portions 11$^e$ and 11$^f$ from which said portions slope away by a gradual descent.

The entering car, as in the former case, is guided astride the carriage which latter occupies the position shown in Fig. 7 of the drawings. In this position the front and rear axles of the car clear the upper surface or top of the carriage, but as the car proceeds under its own power the front axle 19 strikes the abutment 18, as before, and pushes the carriage with it, the front wheels of the carriage climbing from the way surface 11$^e$ to the peak between 11$^e$ and 11$^f$ and clearing the floor. During this forward movement of the car, the drive wheels 20, in contact with the floor, cause the rear wheels 17 of the carriage to climb the incline 11$^d$ and at the time the front wheels of the carriage have reached the peak between 11$^e$ and 11$^f$ the rear wheels of the carriage have not quite reached the horizontal portion 11$^b$ of the ways. This position of the car is shown in dot and dash lines in Fig. 7. The front wheels 17 of the carriage now pass over the peak onto the concave portion 11$^f$ and gravity acting by means of this sharper decline assisted by the momentum of the car advances the carriage to a position with the rear wheels on the horizontal portion 11$^b$ and with the drive wheels of the car clear of the floor. Further, the momentum of the car assisted by the incline 11$^f$ carries the carriage forward, its front wheels 17 ascending the left hand portion of the incline 11$^f$, where it is brought to rest in the position shown in Fig. 8, and there held by the engagement of the detent lever 33 with the axle 16 of the forward carriage wheels.

It will thus be seen that the carriage and the supported car are held in the position shown in Fig. 8 against their natural inclination to run to the right under the influence of gravity. Both wheels of the car are clear of the floor. When it is desired to again use the car, the owner merely presses upon the tail 34 of the detent lever with his foot, releasing the engagement between said detent and the carriage axle, whereupon the weight of the carriage and its load traveling down the left hand incline of the way surface 11$^f$ brings the rear carriage wheel 17 onto the incline 11$^d$ which, in turn, carries the front carriage wheel 17 over the peak between 11$^e$ and 11$^f$, and the further descent of the carriage on the inclines 11$^d$ and 11$^e$ bring the drive wheels of the car in contact with the floor. Thereupon the car proceeds under its own power free of the lifting device and out of the garage.

I have heretofore described a guard for use in connection with cars having truss rods at the rear axle, whereby the rear axle is supported independently of the truss rods. Such a device, permanently attached to the car, answers its purpose admirably particularly with small cars. However, in connection with large cars and where such a permanent attachment to the car is not desired, I equip the carriage of my improved elevating device with means for interposition between the carriage and axle, whereby the rear axle is supported independently of the truss rods, such supports being movable from an inoperative to an operative position automatically as the car enters upon and leaves the carriage. Such device is shown in Figs. 9 and 10 of the drawing in detail.

At the rear end of each of the side members 14 of the carriage is pivoted at 35 a swinging pedestal or support 36 the head of which carries a laterally projecting nose 37. The pedestal 36 has an offset lug or projection 38 forming a point of connection by means of the pivot 39 with a link 40 the opposite end of which is pivoted at 41 to the arm 42 of a lever fulcrumed at 43. The opposite end 44 of this lever is bifurcated to provide a slot 45 within which plays a cross rod 46. Likewise pivoted at the point 39 is a freely swinging arm 47, the lower end of which is provided at 48 with a hooked portion and at 49 with a cam face.

It will be understood that the mechanism just described is mounted in duplicate upon the two sides of the carriage at the rear end.

As the car enters the garage and proceeds under its power to a position astride the carriage, the parts of the rear axle supporting mechanism occupy the position shown in Fig. 9. They continue to occupy this position until the front axle of the car strikes the abutment 18. Thereafter, the carriage itself moves forward and, in doing so, the relative position of the axle 16 of the carriage and the cross rod 46 fixed upon the ways 13 changes. The cross rod 46 acting upon the bifurcated lever and through the link 40 upon the pedestal 36, swings the latter to the position shown in Fig. 10, the nose 37 entering between the rear axle of the car 22 and the truss rod 23. During this movement, the face 49 of the swinging arm 47 rides off the axle 16 of the carriage and engages the hooked portion 48 in front of said axle as shown in Fig. 10, thus locking the pedestal 36 in its elevated position as will clearly be seen. The continued forward movement of the car and with it the carriage causes the gradual lifting of the latter as its wheels 17 ascend the incline as previously described, bringing the head of the pedestal 36 in contact with the lower side of the rear axle 22 lifting the rear wheels of the car clear of the floor.

Upon a reverse movement, as the car leaves the carriage with its rear wheels 20 in contact with the floor, the cross rod 46 engages within the notch 45 as the carriage descends to the position shown in Fig. 10, and lifts the lower end of the arm 47 by engagement with its face 48, thus relieving the hooked end of said arm from engagement with the axle 16 and at the same time moving the lower bifurcated end of the lever to the left and thus swinging by means of the link 40 the pedestal 36 to its prone position as illustrated in Fig. 9, thus leaving the car free to continue its rearward movement clear of the carriage.

In Fig. 11, is shown a slightly modified form of the abutment for the forward axle previously shown and described, the distinguishing feature of which is that this abutment $18^a$ has stepped operating surfaces $18^b$ and $18^c$, the former coming into play in connection with shorter cars having lower front axles and the latter in the case of longer cars having a higher front axle. This abutment, moreover, is adjustable lengthwise of the carriage to render the same further adaptable to various sizes of cars.

I claim:—

1. A self-lifting jack for cars comprising ways progressively elevated, a wheeled carriage mounted thereon and having a length in excess of the wheel base of the car with which it is adapted to be used, said carriage adapted to be straddled by the car and having side frame members underlying the car axle, and an abutment at the front end of the carriage for engagement with the front axle of the car, the height of the carriage so proportioned that when on the lower portions of the ways the car axle will clear the same but not the abutment and that when on the more elevated portions of the ways the car axle will rest on the carriage with the wheels clear of the floor, the different elevations of the ways comprising a horizontal portion, a concave portion at the rear thereof and two concave portions of different depths with an intermediate peak at the front thereof, the several portions so proportioned that the traction wheels of the car will force the front wheels of the carriage to an elevation with the front wheels of the car clear of the floor and to spare and acquired momentum, assisted by gravity as to the front wheels of the carriage pass over the peak and descend into the concave portion will carry the rear wheels of the carriage to an elevation with the traction wheels clear of the floor and the front wheels of the carriage up the forward incline of the concave portion, and releasable means to bring the loaded carriage to a stop and maintain it at rest on the last mentioned incline, whereby when released the carriage with its load will descend by gravity to a lower elevation with the car traction wheels in contact with the floor.

2. A self-lifting jack for cars comprising progressively elevated ways, a wheeled carriage mounted thereon including side members arranged to underlie the front and rear axle of the car, an abutment on the carriage at the front end adapted to be engaged by the front axle of the car, a pedestal on the carriage at the rear end adapted to be interposed between the carriage and the rear axle of the car by the relative movement of the carriage and ways, the height of the carriage so proportioned that when on the lower portion of the ways the car axle will clear the same but not the abutment and that when on the more elevated portion of the ways the front axle will rest on the carriage frame and the rear axle on the pedestal with the wheels clear of the floor.

3. A self-lifting jack for cars comprising progressively elevated ways, a wheeled carriage mounted thereon including side members arranged to underlie the front and rear axle of the car, an abutment on the carriage at the front end adapted to be engaged by the front axle of the car, a pedestal on the carriage at the rear end adapted to be interposed between the carriage and the rear axle of the car, and stationary means engaged by the advancing carriage for swinging said pedestal to and from an operative position, the height of the carriage so proportioned that when on the lower portion of the ways the car axle will clear the same but not the abutment and that when on the more elevated portion of the ways the front axle will rest on the carriage frame and the rear axle on the pedestal with the wheels clear of the floor.

4. A self-lifting jack for cars comprising progressively elevated ways, a wheeled carriage mounted thereon including side members arranged to underlie the front and rear axle of the car, an abutment on the carriage at the front end adapted to be engaged by the front axle of the car, a supporting pedestal at the rear end of the carriage arranged for interposition between the carriage and the rear axle of the car, the height of the carriage so proportioned that when on the lower portion of the ways the front axle will clear the carriage but not the abutment and the rear axle will clear the pedestal and that when on the more elevated portion of the ways the axles will rest on the carriage and on the pedestal respectively with the wheels clear of the floor, said pedestal comprising a pair of members each having a nose portion and pivoted to the carriage at each side of the longitudinal center to swing from a prone inoperative position to an upright operative position with the nose portion projected beneath the rear axle of the car, and means for automatically operating said pedestal comprising a bifurcated lever fulcrumed on the carriage with one arm linked to the pedestal and the bifurcated arm arranged to engage with a stationary rod on the ways when descending said ways, and a swinging rocking arm pivoted to the pedestal and arranged to engage over the axle of the carriage to hold the pedestal in upright position and to be disengaged therefrom to release the pedestal when the carriage descends the ways.

In testimony whereof I have hereunto signed my name in the presence of two subscribing witnesses.

EDWARD CHARLES ROLD.

Witnesses:
L. T. GREIST,
MARY C. BROWER.

Copies of this patent may be obtained for five cents each, by addressing the "Commissioner of Patents, Washington, D. C."

It is hereby certified that in Letters Patent No. 1,315,335, granted September 9, 1919, upon the application of Edward C. Rold, of Oakville, Iowa, for an improvement in "Self-Lifting Jacks," errors appear in the printed specification requiring correction as follows: Page 3, line 122, claim 1, strike out the comma; same page and claim, line 123, strike out the word "to"; and that the said Letters Patent should be read with these corrections therein that the same may conform to the record of the case in the Patent Office.

Signed and sealed this 28th day of October, A. D., 1919.

[SEAL.]

M. H. COULSTON,

*Acting Commissioner of Patents.*

Cl. 254—88.